US011326008B2

(12) United States Patent
Devisme et al.

(10) Patent No.: US 11,326,008 B2
(45) Date of Patent: May 10, 2022

(54) SYNTHESIS OF SURFACTANT-FREE POLY (VINYLIDENE FLUORIDE) LATEXES VIA RAFT EMULSION POLYMERIZATION

(71) Applicant: Arkema France, Colombes (FR)

(72) Inventors: Samuel Devisme, Rouen (FR); Andrew Kahn, Eagleville, PA (US); Mathieu Fuentes-Exposito, Villeurbanne (FR); Timothy McKenna, Lyons (FR); Franck D'Agosto, Genas (FR); Muriel Lansalot, Genas (FR); Anthony Bonnet, Saint Laurent de Mure (FR)

(73) Assignee: Arkema France, Colombes (FR)

( * ) Notice: Subject to any disclaimer, the term of this patent is extended or adjusted under 35 U.S.C. 154(b) by 36 days.

(21) Appl. No.: 16/649,686

(22) PCT Filed: Sep. 21, 2018

(86) PCT No.: PCT/EP2018/075677

§ 371 (c)(1),
(2) Date: Mar. 23, 2020

(87) PCT Pub. No.: WO2019/063445

PCT Pub. Date: Apr. 4, 2019

(65) Prior Publication Data

US 2020/0255566 A1 Aug. 13, 2020

(30) Foreign Application Priority Data

Sep. 27, 2017 (FR) ...................................... 1758966

(51) Int. Cl.

| | |
|---|---|
| ***C08F 214/22*** | (2006.01) |
| ***C08F 2/22*** | (2006.01) |
| ***C08F 2/38*** | (2006.01) |
| ***C08K 5/14*** | (2006.01) |
| ***C08K 5/36*** | (2006.01) |
| ***C08L 53/00*** | (2006.01) |
| ***C09D 127/16*** | (2006.01) |

(52) U.S. Cl.

CPC ........... *C08F 214/225* (2013.01); *C08F 2/22* (2013.01); *C08F 2/38* (2013.01); *C08K 5/14* (2013.01); *C08K 5/36* (2013.01); *C08L 53/00* (2013.01); *C09D 127/16* (2013.01); *C08F 2438/03* (2013.01); *C08F 2810/40* (2013.01); *C08L 2203/16* (2013.01)

(58) Field of Classification Search

CPC combination set(s) only.
See application file for complete search history.

(56) References Cited

U.S. PATENT DOCUMENTS

2004/0171777 A1* 9/2004 Le ........................ C07C 329/00 526/286
2005/0266038 A1* 12/2005 Glauser .................. A61P 31/04 424/423
2006/0281845 A1* 12/2006 Amin-Sanayei ........ C08F 14/22 524/386
2007/0082993 A1* 4/2007 Amin-Sanayei ........ C08L 33/14 524/386
2012/0142858 A1 6/2012 Amin-Sanayei et al.
2012/0309900 A1* 12/2012 Noda ................... C07C 327/36 525/55
2015/0011693 A1* 1/2015 Destarac .................. C08F 2/38 524/505
2015/0119523 A1* 4/2015 Ameduri ............. C08F 214/182 524/546
2017/0081447 A1* 3/2017 Dossi ................. C08F 214/222
2017/0253685 A1* 9/2017 Ferrari .................. C08F 283/06

FOREIGN PATENT DOCUMENTS

CA 2646836 A1 * 7/2007 .......... C08F 293/005
CN 104610519 A * 5/2015
WO 20060135543 A2 12/2006
WO 20080073685 A1 6/2008

OTHER PUBLICATIONS

Binauld, "Emulsion Polymerization of Vinyl Acetate in the Presence of Different Hydrophilic Polymers Obtained by RAFT/MADIX", Macromolecules 2014, 47, 3461-3472 (Year: 2014).*
Lipscomb, Microphase Separation Mode-Dependent Mechanical Response in Poly(vinyl ester)/PEO Triblock Copolymers, Macromolecules 2011, 44, 4401-4409 (Year: 2011).*
Sandra Binauld et al, "Emulsion Polymerization of Vinyl Acetate in the Presence of Different Hydrophilic Polymers Obtained by RAFT/MADIX", Macromolecules, vol. 47, No. 10, May 27, 2014 (May 27, 2014), pp. 3461-3472, Ref. No. XP055164039, ISSN: 0024-9297, DOI: 10.1021/ma402549x cited in application example 16; table 3 Abstract only provided.

* cited by examiner

*Primary Examiner* — Nicole M. Buie-Hatcher
(74) *Attorney, Agent, or Firm* — Joanne Rossi

(57) ABSTRACT

The present invention relates to a process for producing a stable fluorinated latex by emulsion polymerization in the absence of fluorinated surfactant, stabilized by an amphiphilic block copolymer formed in situ. The invention also concerns the aqueous dispersion comprising the fluorinated polymer chains and the amphiphilic block copolymers, obtained by this process.

11 Claims, No Drawings

SYNTHESIS OF SURFACTANT-FREE POLY (VINYLIDENE FLUORIDE) LATEXES VIA RAFT EMULSION POLYMERIZATION

CROSS-REFERENCE TO RELATED APPLICATIONS

This application is the U.S. National Stage Application under 35 U.S. C. § 371 of PCT/EP2018/075677 filed Sep. 21, 2018, which claims the benefit of French National Patent 1758966 filed Sep. 27, 2017, the contents of which are hereby incorporated by reference.

FIELD OF THE INVENTION

The present invention relates to a process for producing a stable fluorinated latex by emulsion polymerization in the absence of fluorinated surfactant, stabilized by an amphiphilic block copolymer formed in situ. The invention also concerns the aqueous dispersion comprising the fluorinated polymer chains and the amphiphilic block copolymers, obtained by this process.

Another aspect of this invention are the applications of the aqueous PVDF dispersion for the preparation of membranes, coatings and films.

TECHNICAL BACKGROUND

Poly(vinylidene fluoride) (PVDF) is a fluorinated polymer widely used in coating applications. PVDF is weather resistant and has excellent energy storage capacities particularly attractive in terms of sustainable development.

Fluorinated latexes usually rely on the use of low molar mass fluorinated surfactants. However, surfactant molecules can impact the stability of the latex subjected to freezing or high shear. They can also have detrimental effects on the mechanical properties of the films when exposed to water or high humidity. In addition, the potential release of fluorinated species in the environment is an additional problem because of the well-known toxicity of these products.

The use of polymeric surfactants, in particular of block copolymers, in emulsion and dispersion polymerization, is well-known, especially for block copolymers formed using a Reversible Addition-Fragmentation chain Transfer (RAFT) technique.

The Polymerization-Induced Self-Assembly (PISA) process was first described by Ferguson et al. in *Effective ab initio emulsion polymerization under RAFT control*. Macromolecules, 2002, 25, 9243-9245. Water-soluble macromolecular RAFT agents (ie water soluble chains carrying a thiocarbonylated chain end and able to mediate a RAFT polymerization, called macroRAFTs) are used to mediate the polymerization of a hydrophobic monomer in water. MacroRAFTs carry a reactive chain end which allows them participating to the polymerization. Thereby if water-soluble macroRAFTs are used during the emulsion polymerization of a hydrophobic monomer, amphiphilic block copolymers can be formed in situ. When the hydrophobic block reaches a certain molar mass, macromolecular chains will become insoluble in water and will self-assemble in particles swollen by monomer. The end of the chain is still reactive and positioned at the end of the hydrophobic block, and the polymerization will continue in the heart of the resulting self-stabilized particles. Thanks to this process, the hydrophilic part confers stability to the particle without the need of surfactants.

It has now been found that self-stabilized PVDF particles can be obtained by a process combining the advantages of emulsion polymerization with those of controlled radical polymerization (CRP) using the RAFT method, without adding surfactant, especially without adding any low molar mass fluorosurfactant. The process of the invention also allows to produce small particle size emulsion permitting the PVDF latex to be stable during storage and enabling film formation.

SUMMARY OF THE INVENTION

According to a first aspect, the invention concerns a process for producing a stable vinylidene fluoride polymer latex by emulsion polymerization in the absence of fluorinated surfactant, said process comprising the steps of:

a. providing a poly(ethylene glycol)-based (PEG-based) hydrophilic macroRAFT, forming a first hydrophilic block, b. synthesis of a vinylidene fluoride polymer and chain extension of said hydrophilic block with vinylidene fluoride (VDF) monomer, alone or in combination with at least one other ethylenically unsaturated comonomer, in the presence of initiator, and optionally of a chain transfer agent and/or a antifoulant, forming a second hydrophobic block.

Advantageously, the weight ratio initiator/macroRAFT in step b ranges from 1 to 4. This enables the in situ formation of an amphiphilic block copolymer PEG-b-PVDF composed of said hydrophilic block and said hydrophobic block. The amphiphilic block copolymer functions as a polymeric surfactant for the PVDF particles also formed during step b, to which it is anchored. This polymeric surfactant yields stable PVDF latexes while avoiding the need of using low molar mass fluorinated surfactants.

The invention also relates to an aqueous dispersion comprising PVDF polymer particles and amphiphilic block copolymers composed of a hydrophilic block of PEG-based hydrophilic macroRAFT, and of a hydrophobic block composed of vinylidene fluoride (VDF) monomer, alone or in combination with at least one other ethylenically unsaturated comonomer, said PVDF particles having an average particle size from 20 to 300 nm, said PVDF dispersion having a solid content of 1 to 60, preferably of 15 to 45 weight percent, and being free of low molar mass fluorinated surfactant.

The invention also relates to the applications of the aqueous PVDF dispersion for the preparation of membranes, coatings and films.

The present invention makes it possible to overcome the disadvantages of the state of the art. It more particularly provides a process of emulsion polymerization of VDF which is mediated by specific hydrophilic polymer chains made by RAFT (macroRAFT), used in low concentration to form in situ amphiphilic block copolymers able to provide particle stabilization. The resulting particles are constituted of the amphiphilic block copolymers resulting from the PISA process, covalently anchored to the particles, and of PVDF polymer chains.

The macroRAFT agent, composed of a hydrophilic block, functions as a precursor of emulsifier for fluoromonomer polymerization. The macroRAFT participates in the polymerization, becoming part of the chain and providing in situ latex stability. That also brings hydrophilic moieties to the PVDF chains which give additional and valuable end use properties in membranes, coatings and films.

DESCRIPTION OF EMBODIMENTS OF THE INVENTION

The invention is now described in detail.

The present invention describes a way to prepare poly (vinylidene fluoride) latexes, stabilized by block copolymers formed in situ via RAFT emulsion polymerization without adding any fluorosurfactant.

According to one embodiment, this process requires the synthesis by CRP (controlled radical polymerization) of hydrophilic polymer chains in water, followed by their chain extension with a VDF hydrophobic monomer in the same reactor leading to the formation of amphiphilic block copolymers. These copolymers can play the role of a macromolecular stabilizer. The as formed stabilizer will be covalently anchored at the surface of the particles of PVDF.

According to another embodiment, a preformed hydrophilic polymer (synthesized by CRP) is chemically modified in order to introduce one or two thiocarbonate end(s) in the polymer, as detailed below.

According to a first aspect, the invention provides a process for producing a stable PVDF latex by emulsion polymerization in the absence of low molar mass fluorinated surfactant.

In the first step (step a), a functionalized PEG forming the hydrophilic block is formed by modification of at least one hydroxyl function of a PEG methyl ether according to depicted strategies available in the literature, as described by Binauld S. et al. in the publication "Emulsion Polymerization of Vinyl Acetate in the Presence of Different Hydrophilic Polymers Obtained by RAFT/MADIX", *Macromolecules,* 2014, 47 (10), pp 3461-3472 or by Lipscomb C E et Mahanthappa M K in "Microphase Separation Mode-Dependent Mechanical Response in Poly(vinyl ester)/PEO Triblock Copolymers", *Macromolecules,* 2011, 44 (11), pp 4401-4409.

According to an embodiment, the hydrophilic block is obtained by the modification of a —OH group of PEG methyl ether $CH_3(CH_2CH_2O)_nOH$ with xanthate and the hydrophilic block obtained has the general formula below:

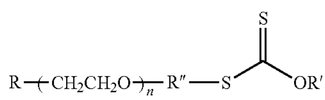

with R' being alkyl or aryl, R" being —C(═O)—C($CH_3$)— and R═OH, O-alkyl, O-aryl or a polymer.

In a second step (step b), the resulting PEG-based hydrophilic macroRAFT is then used in the emulsion polymerization of VDF. The stabilization is here ensured by the formation of amphiphilic PEG-b-PVDF diblock copolymers.

According to another embodiment, a PEG-based hydrophilic macroRAFT can also be obtained according to the above mentioned publication (Lipscomb C E et Mahanthappa M K in "Microphase Separation Mode-Dependent Mechanical Response in Poly(vinyl ester)/PEO Triblock Copolymers", *Macromolecules,* 2011, 44 (11), pp 4401-4409). In this case, the hydrophilic block is a telechelic PEG carrying two xanthate groups on both chain ends and is obtained by modification of the hydroxyl functions of a di-hydroxy-poly(ethylene glycol):

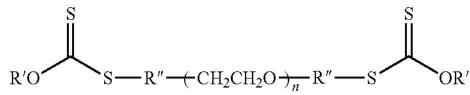

with R' being alkyl or aryl and R" being —C(═O)—C ($CH_3$)—.

The resulting PEG-based hydrophilic macroRAFT is then used in the emulsion polymerization of VDF. The stabilization is here ensured by the formation of amphiphilic PVDF-b-PEG-b-PVDF triblock copolymers rather than PEG-b-PVDF diblock copolymers.

According to another embodiment, a PEG-based hydrophilic macroRAFT can also be obtained by RAFT polymerization of a PEG carrying a polymerizable acrylate moiety (PEGA) in the presence of a xanthate:

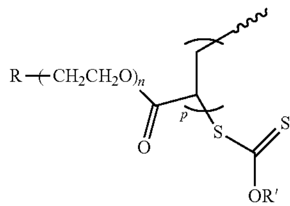

with R' being alkyl or aryl and R═OH, O-alkyl, O-aryl or a polymer.

The resulting funtionalized poly(PEGA) (or alternatively designated by P(PEG-A)-X) is then used in the emulsion polymerization of VDF.

In the second step (step b), VDF alone or in combination with at least one fluorinated or unfluorinated co-reactive monomer is polymerized in the presence of an initiator.

The term "vinylidene fluoride polymer" used herein includes both normally solid, homopolymers and copolymers within its meaning. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, perfluoromethyl vinyl ether, perfluoropropyl vinyl ether and any other monomer that would readily copolymerize with vinylidene fluoride. Terpolymers of vinylidene fluoride, hexafluoropropene and tetrafluoroethylene and terpolymers of vinylidene fluoride, trifluoroethylene and tetrafluoroethylene are also representatives of the class of vinylidene fluoride copolymers that can be prepared by the process embodied herein.

The unfluorinated monomers useful in the aqueous-based polymerization of the invention are ethylenically unsaturated monomers chosen from: (meth)acrylic acid and (meth) acrylic esters such as alkyl(meth)acrylates, vinyl esters such as vinyl acetate, vinyl propionate, vinyl butyrate, vinyl benzoate, maleic esters such as dimethyl maleate, diethyl maleate, di-n-propyl maleate, diisopropyl maleate, di-2-methoxyethyl maleate, fumaric esters such as dimethyl fumarate, diethyl fumarate, di-n-propyl fumarate, diisopropyl fumarate, styrene, vinyltoluene, alpha-methylstyrene and acrylonitrile, anhydrides, vinyl esters, alpha-olefins, substituted or unsubstituted mono and dialkyl esters of unsaturated dicarboxylic acids, vinyl aromatics, and cyclic monomers.

Although the process of the invention will be generally illustrated with respect to the polymerization of vinylidene fluoride homopolymer, one of skill in the art will recognize that analogous polymerization techniques can be applied to the preparation of copolymers of vinylidene fluoride with fluorinated or unfluorinated co-reactive monomers.

The polymers are conveniently made by an emulsion polymerization process, but could also be synthesized by a suspension, solution, or supercritical $CO_2$ process using non-fluorinated macroRAFT agents.

In the emulsion polymerization process of step b, the reactor used in step a is further charged with deionized water, and optionally paraffin antifoulant and/or a chain-transfer agent.

The mixture is stirred and deoxygenated. A predetermined amount of chain transfer agent, CTA, is then introduced into the reactor, though no CTA might be used in the present process. The reactor temperature is raised to the desired level and vinylidene fluoride fed into the reactor. Once the initial charge of vinylidene fluoride is introduced and the pressure in the reactor has reached the desired level, at least one radical initiator is added to start and maintain the polymerization reaction. The vinylidene fluoride is continuously fed optionally along with additional initiator to maintain the desired pressure. The temperature of the reaction can vary depending on the characteristics of the initiator used and one of skill in the art will know how to do so. Typically the reactor temperature will be from about 30° to 120° C., preferably from about 60° to 110° C. The polymerization pressure may vary, typically within the range of from 200 to 10000 kPa. Once the desired amount of polymer conversion has been reached in the reactor, the monomer feed will be stopped, but initiator is optionally added to consume residual monomer. Residual gases (containing unreacted monomers) are then vented and the latex recovered from the reactor. The polymer may then be isolated from the latex by standard methods, such as freeze thaw, spray-dry, freeze-dry, or high shear coagulation separation.

During step b, also takes place the chain extension of the hydrophilic block with vinylidene fluoride (VDF) monomer, alone or in combination with at least one other ethylenically unsaturated comonomer, in the presence of initiator, and forming a second hydrophobic block.

The term "initiator" and the expressions "radical initiator" and "free radical initiator" refer to a chemical that is capable of providing a source of free radicals, either induced spontaneously, or by exposure to heat or light. Examples of initiators include peroxides, peroxydicarbonates and azo compounds. The term expression also includes redox systems useful in providing a source of free radicals.

The radical initiator is added to the reaction mixture in an amount sufficient to initiate and maintain the polymerization reaction at a desired reaction rate. The order of addition may vary according to the desired process and latex emulsion characteristics.

The radical initiator may comprise a persulfate salt, such as sodium persulfate, potassium persulfate, or ammonium persulfate. The amount of persulfate salt added to the reaction mixture (based upon the total weight of monomer added to the reaction mixture) is from about 0.005 to about 1.0 weight percent.

The radical initiator may comprise an organic peroxide such as an alkyl, dialkyl, or diacyl peroxide, peroxydicarbonates, and peroxy esters in an amount from about 0.5 to about 2.5 weight percent on total monomer.

Chain-transfer agents are optionally added to the polymerization to regulate the molecular weight of the product. They may be added to a polymerization in a single portion at the beginning of the reaction, or incrementally or continuously throughout the reaction. The amount and mode of addition of chain-transfer agent depend on the activity of the particular chain-transfer agent employed, and on the desired molecular weight of the polymer product. When added, the amount of chain-transfer is preferably from about 0.05 to about 5 weight percent, more preferably from about 0.1 to about 2 weight percent based on the total weight of monomer added to the reaction mixture.

Examples of chain transfer agents useful in the present invention include, but are not limited to oxygenated compounds such as alcohols, carbonates, ketones, esters, and ethers; halocarbons and hydrohalocarbons, such as chlorocarbons, hydrochlorocarbons, chlorofluorocarbons and hydrochlorofluorocarbons; ethane and propane.

The optional addition of a paraffin wax or hydrocarbon oil to the reaction serves as an antifouling agent to minimize or prevent polymer adhesions to the reactor components. Any long chain saturated hydrocarbon wax or oil can perform this function. The amount of oil or wax added to the reactor is an amount which serves to minimize the formation of polymer adhesions to the reactor components. The amount is generally proportional to the interior surface area of the reactor and may vary from about 1 to about 40 mg per square centimeter of reactor interior surface area. The amount of paraffin wax or hydrocarbon oil is preferably about 5 $mg/cm^2$ of the reactor interior surface area.

According to a second aspect, the invention relates to aqueous stable PVDF dispersion comprising PVDF particles, residues of initiator, and an amphiphilic block copolymer composed of a hydrophilic block containing PEG, and of a hydrophobic block composed of vinylidene fluoride (VDF) monomer, alone or in combination with at least one other ethylenically unsaturated comonomer, said PVDF particles having an average particle size from 20 to 300 nm, as measured by dynamic light scattering, said PVDF dispersion having a solid content of 1 to 60, preferably of 15 to 45 weight percent (as measured by gravimetry) and being free of low molar mass fluorinated surfactant. The weight ratio PEG-X/PVDF varies from 0.1 to 10 (in %), preferably from 0.2 to 9.1 (in %), the amount of PVDF being determined from the solids content minus all the other species including initiator, poly(ethylene glycol)-based hydrophilic macroRAFT and buffer.

The PVDF dispersions have good latex stability and shelf-life, and a good quality of film formation. Additionally, the particle size of dispersion being small, it is advantageous for many direct applications of fluoropolymer in a latex form, such as manufacture of membranes, coatings and films.

EXAMPLES

The following examples illustrate the invention without limiting it.

1) Reagents

The following reagents were used in the examples:

Poly(ethylene glycol) methyl ether (Aldrich, PEG-OH, $M_n \approx 2000$ and 750 g $mol^{-1}$), triethylamine (Aldrich, 99.5%), 2-bromopropionyl bromide (Aldrich, 97%), sodium hydrogen carbonate ($NaHCO_3$) (Aldrich, 99.7%), ammonium chloride ($NH_4Cl$) (Aldrich, 99.5%), dichloromethane (Aldrich, 99.8%), magnesium sulfate (Aldrich, >99.9%), O-ethyl xanthic acid (Aldrich, 96%), α,ω-dihydroxy poly (ethylene glycol) (Aldrich, HO-PEG-OH, $M_n \approx 2050$ g $mol^{-1}$), Poly(ethylene glycol) methyl ether acrylate (Aldrich, PEG-A, M 480 g mol$^{-1}$), azobisisobutyronitrile (AIBN, Aldrich, 98%), 1,4-dioxane (Alfa Aesar, 99.8%) potassium persulfate (KPS) (Aldrich, 99%), sodium acetate (Aldrich, 99%), potassium 3,3,4,4,5,5,6,6,7,7,8,8,8-tridecafluoro-1-octanesulphonate (Capstone® FS-17) (FS) and vinylidene fluoride (VDF) were used as received. Water was deionized with a PureLab system.

O-ethyl-S-(1-ethoxycarbonyl) ethyl dithiocarbonate (X1) was synthesized according to the protocol described in Taton, D. et al. M. *Direct Synthesis of Double Hydrophilic Statistical Di-and Triblock Copolymers Comprised of Acrylamide and Acrylic Acid Units via the MADIX Process*. Macromolecular Rapid Communications, 2001, 22, 1497-1503.

2) Characterization Techniques

Nuclear Magnetic Resonance (NMR) was used to determine the monomer conversion and the macroRAFT purity. The compound was dissolved in appropriate deuterated solvent at a concentration around 30 mg g$^{-1}$. The spectra were recorded at room temperature with a high resolution spectrometer (Bruker AC 300). The chemical shift was calibrated with respect to the peak of the used solvent.

Concerning the VDF emulsion polymerization, the solids content (SC) was determined by gravimetry. The particle size ($D_z$) and dispersity ($\sigma$) were measured by dynamic light scattering (DLS). Analyses were performed on a NanoZS from Malvern Instruments at 25° C. with a scattering angle of 173°.

Differential Scanning Calorimetry (DSC) measurements were performed on a Mettler Toledo DSC-1. The dried samples were submitted to two successive heating (−20 to 210° C. at 10° C. min$^{-1}$) and cooling (210 to −20° C. at −10° C. min$^{-1}$) cycles in a standard 40 μL aluminium crucible with an empty reference crucible. Thermal history of the samples was erased by the first heat at 210° C. The analyzed data (crystallization temperature $T_c$, melting temperature $T_m$ and crystallinity Xc (in %) were extracted from the second heating. Crystallinity was calculated with the following equation where $\Delta H_{f,\infty}$ is 105 J g$^{-1}$.

$$Xc\ (\%)=(\Delta H_{f,measured}/\Delta H_{f,\infty})\times 100$$

3) Experimental Procedures

3.1. Synthesis of the PEG-Based Hydrophilic MacroRAFTs (PEG-X)

Poly(ethylene glycol) methyl ether ($M_n$=2000 g mol$^{-1}$) (20 g; 0.01 mol) was dissolved in dichloromethane (80 mL), and triethylamine (2.73 g; 0.027 mol) was then added. 2-bromopropionyl bromide (4.97 g; 0.023 mol) was added dropwise to the mixture put in an ice bath. It was then removed and the reaction mixture stirred for 16 h. Residual salts were then filtrated. The organic phase was washed with saturated aqueous solution of $NH_4Cl$ (1×15 mL), $NaHCO_3$ (1×15 mL) and water (1×15 mL). The washed organic phase was then dried with magnesium sulfate and the solvent evaporated under vacuum.

The product obtained (15.41 g; 0.0066 mol) was dissolved in dichloromethane (55 mL). Then, O-ethyl xanthic acid (3.17 g; 0.0198 mol) was added by small amount under stirring. The reaction mixture was stirred overnight. KBr salts were removed by filtration. The mixture was washed with saturated aqueous solution of $NH_4Cl$ (2×15 mL) and of $NaHCO_3$ (2×15 mL) then water (1×15 mL). The washed organic phase was then dried with magnesium sulfate and the solvent evaporated under vacuum. The polymer was then precipitated in cold petroleum ether. Finally, the product was dried under vacuum. The same procedure was followed with another commercial PEG-OH ($M_n$=750 g mol$^{-1}$).

$^1$H NMR ($CDCl_3$, 300 MHz, δ ppm): 4.6 (q, 2H, O—$CH_2$—$CH_3$); 4.4 (q, 1H, CH—S); 4.3 (t, 2H, $CH_2$—$CH_2$—O); 3.75-3.5 (s, 180H, ($CH_2$—$CH_2$—O)$_n$); 3.35 (s, 3H, $CH_3$—O); 1.6 (d, 3H, CH—$CH_3$); 1.4 (t, 3H, $CH_2$—$CH_3$).

3.2. Emulsion Polymerization of VDF (Examples 1-20)

VDF emulsion polymerizations were all carried out in a 50 mL stainless reactor equipped with a nitrogen inlet and a mechanical stirrer, and connected to the VDF bottle. KPS, FS (or PEG-OH or PEG-X) and sodium acetate were introduced in the reactor. 25 mL of deionized water were then added. The medium was deoxygenated under nitrogen for 30 min. 30 bar of VDF were then used to fill the reactor and the medium heated at a set point temperature of 80° C. When the reaction was stopped, the obtained latex was collected and the particle size measured. A small fraction was dried to determine the solids content and the crystallinity. The operating conditions as well as the characteristics of all the VDF emulsion polymerizations (Examples 1 to 20) are summarized in Tables 1 to 4.

3.3. Synthesis of a Di-Functional X-PEG-X MacroRAFT Agent

Poly(ethylene glycol) ($M_n$=2050 g mol$^{-1}$) (20 g; 0.01 mol) was dissolved in dichloromethane (80 mL) and triethylamine (5.46 g; 0.054 mol) was then added. The mixture was added dropwise in a flask containing 2-bromopropionyl bromide (9.94 g; 0.046 mol) and placed in an ice bath. The flask was then removed and the reaction mixture stirred for 16 h. Residual salts were then filtrated. The organic phase was washed with saturated aqueous solution of $NH_4Cl$ (lx 15 mL), $NaHCO_3$ (1×15 mL) and water (1×15 mL). The washed organic phase was then dried with magnesium sulfate and the solvent evaporated under vacuum.

The product obtained (16.20 g; 0.0079 mol) was dissolved in dichloromethane (55 mL). Then, O-ethyl xanthic acid (7.60 g; 0.0474 mol) was added by small amounts under stirring. The reaction mixture was stirred overnight. KBr salts were removed by filtration. The mixture was washed with saturated aqueous solution of $NH_4Cl$ (2×15 mL) and of $NaHCO_3$ (2×15 mL) then water (1×15 mL). The washed organic phase was then dried with magnesium sulfate and the solvent evaporated under vacuum. The polymer was then precipitated in cold petroleum ether. Finally, the product was dried under vacuum.

$^1$H NMR ($CDCl_3$, 400 MHz, δ ppm): 4.6 (q, 2H, O—$CH_2$—$CH_3$); 4.4 (q, 1H, CH—S); 4.3 (t, 2H, $CH_2$—$CH_2$—O); 3.75-3.5 (s, 220H, ($CH_2$—$CH_2$—O)$_n$); 1.6 (d, 3H, $CHCH_3$); 1.4 (t, 3H, $CH_2$—$CH_3$).

The number-average molar mass ($M_n$) and dispersity (Đ=$M_w/M_n$) were determined by size exclusion chromatography (SEC) in THF (Polystyrene (PS) standards).

3.4. Synthesis of a P(PEG-A) by Conventional Radical Polymerization

In a typical experiment, 76.0 mg of AIBN ($1.80\times10^{-2}$ mol $L^{-1}$) and 6.67 g of PEG-A ($5.45\times10^{-1}$ mol $L^{-1}$) were added in 1,4-dioxane in a round bottom flask. The medium was deoxygenated under argon for 30 min and then heated at 70° C. The monomer conversion was followed by $^1H$ NMR using $CDCl_3$ as solvent and the relative integration of the protons of the methoxy group and the vinylic protons of PEG-A. $M_n$ and Đ were determined by SEC in DMSO (Poly(methyl methacrylate) (PMMA) standards).

3.5. Synthesis of a P(PEG-A)-X MacroRAFT Agent by Xanthate-Mediated RAFT Polymerization In a typical experiment, 308.6 mg of Xanthate ($5.51\times10^{-2}$ mol $L^{-2}$), 76.0 mg of AIBN ($1.80\times10^{-2}$ mol $L^{-1}$) and 6.67 g of PEG-A ($5.45\times10^{-1}$ mol $L^{-1}$) were added in 1,4-dioxane in a round bottom flask. The medium was deoxygenated under argon for 30 min and then heated at 70° C. The monomer conversion was followed by $^1H$ NMR using $CDCl_3$ as solvent and the relative integration of the protons of the methoxy group and the vinylic protons of PEG-A. $M_n$ and Đ were determined by SEC in DMSO (PMMA standards).

3.6. Emulsion Polymerization of VDF (Examples 21-26)

VDF emulsion polymerizations were all carried out in a 50 mL stainless reactor equipped with a nitrogen inlet and a mechanical stirrer and connected to the VDF bottle. KPS, FS (or HO-PEG-OH or PEG-X or X-PEG-X or PEG-A or P(PEG-A) or P(PEG-A)-X) and sodium acetate were introduced in the reactor. 25 mL of deionized water were then added. The medium was deoxygenated under nitrogen for 30 min. 30 bar of VDF were then used to fill the reactor and the medium heated at a set point temperature of 80° C. When the reaction was stopped, the obtained latex was collected and the particle size measured. A small fraction was dried to determine the solids content and the crystallinity.

The operating conditions as well as the characteristics of all the VDF emulsion polymerizations (Examples 21 to 25) are summarized in Tables 5 to 6.

4) Results

4.1. Examples 1-2: VDF Emulsion Polymerization in the Presence of a Fluorinated Surfactant (Blank Experiments)

A reference experiment was first performed with a conventional fluorinated surfactant (FS) (Example 1) using 2.2 mg of KPS, 36.3 mg of FS and 1.4 mg of sodium acetate. A similar experiment was then performed using the ten-fold amount of reagents (Example 2, 22.0 mg of KPS, 363.0 mg of FS and 14 mg of sodium acetate). A stable latex was obtained in both cases. For the same polymerization time (1 h 30), the use of more FS leads to smaller particles and higher solids content (Table 1).

TABLE 1

VDF emulsion polymerization carried out with a conventional fluorinated surfactant (FS), PEG-OH[a] or PEG-X[b] using different initiator/polymer ratio at T = 80° C. and P = 30 bar

| Ex | Surfactant or polymer | Time | KPS/ Polymer (wt ratio) | Consumption (bar) | SC (%) | $D_z$ (nm) | σ | Xc (%) |
|---|---|---|---|---|---|---|---|---|
| 1 | FS | 1 h 30 | / | 8.0 | 7.1 | 141 | 0.02 | 41.7 |
| 2 | FS | 1 h 30 | / | 21.0 | 16.2 | 63 | 0.05 | 39.8 |
| 3 | PEG-OH | 4 h | 1.5 | 4.0 | 5.8 | 172 | 0.01 | 49.5 |
| 4 | PEG-OH | 4 h | 2.5 | 15.0 | 11.2 | 234 | 0.01 | 41.4 |
| 5[c] | PEG-OH | 4 h | 3.5 | / | / | / | / | / |
| 6[d] | FS | 1 h 30 | / | 13.8 | 11.6 | 396 | 0.35 | 46.5 |
| 7[e] | FS | 1 h 30 | / | 21.4 | 25.1 | 34 | 0.12 | 35.7 |
| 8 | PEG-X | 4 h | 1.5 | 2.5 | 3.1 | 48 | 0.24 | 42.0 |
| 9 | PEG-X | 4 h | 2.5 | 12.5 | 10.4 | 77 | 0.06 | 40.5 |
| 10 | PEG-X | 4 h | 3.5 | n.d. | 13.5 | 93 | 0.07 | 45.7 |

[a] $M_{n,\ PEG\text{-}OH}$ = 2000 g $mol^{-1}$.
[b] $M_{n,\ PEG\text{-}X}$ = 2300 g $mol^{-1}$.
[c] The latex is not stable.
[d] The mole number of FS is the same as that of PEG-OH in Example 4.
[e] Keeping the same weight ratio KPS/FS (=0.06) with the recipe of Example 1—Destabilization after 24 h.

4.2. Examples 3-20: VDF Emulsion Polymerization in the Presence of Functional Polymers The commercial surfactant FS was then replaced by either PEG-OH ($M_n$=2000 g $mol^{-1}$) or PEG-X ($M_n$=2300 g $mol^{-1}$) chains, using different experimental conditions:

Example 3 follows the same procedure as described in Example 1 but using 30.0 mg of KPS, 19.0 mg of sodium acetate and replacing FS by PEG-OH and using 20.0 mg of this polymer.

Example 4 was carried out following the procedure described in Example 3 varying the KPS amount: 50.0 mg and the sodium acetate amount: 31.0 mg.

Example 5 was carried out following the procedure used in Example 4 but varying the KPS amount: 70.0 mg and the sodium acetate amount: 44.0 mg.

Example 6 was carried out following the procedure used in Example 4 but replacing PEG-OH by the same mole number of FS.

Example 7 was carried out following the procedure used in Example 6 but varying the FS amount to keep the same KPS/FS weight ratio as in Example 1.

Example 8 was carried out following the procedure described in Example 3 but replacing PEG-OH by the same amount of PEG-X.

Example 9 was carried out following the procedure described in Example 4 but replacing PEG-OH by the same amount of PEG-X.

Example 10 was carried out following the procedure described in Example 5 but replacing PEG-OH by the same amount of PEG-X.

The operating conditions as well as the characteristics of these experiments are summarized in Table 1.

PEG-OH was first used instead of FS. Different KPS/Polymer weight ratios (1.5 to 3.5) were investigated to increase the solids content. When the ratio is increased, SC and particles size increase too (Examples 3-4) except for the Example 5. Indeed, with a ratio of 3.5, the latex is not stable. On the other hand, the latexes obtained with PEG-X are stable for every ratios (Examples 8-10). Examples 6 and 7 confirmed the advantage to use a polymer for the stabilization of the PVDF particles. Indeed, for a same mole number of stabilizing species (FS vs PEG-OH), and for a similar SC (Examples 4 and 6), the PVDF latex obtained using PEG-OH shows smaller particle size than the one stabilized with FS (234 nm vs 396 nm). The FS amount was then adjusted in another experiment (Example 7) to have the same KPS/FS weight ratio as in Example 1. Despite the fact that the particles are smaller (34 nm) due to the high FS amount with a high SC (25.10%), the latex is destabilized after 24 h.

For a given KPS/Polymer ratio, the particles size is systematically smaller with PEG-X (e.g. for the ratio 2.5:72 nm for PEG-X compared to 234 nm with PEG-OH, for a similar SC). The irreversible proton transfer reactions associated with VDF polymerization participate to the PVDF latexes stabilization when PEG-OH is used. These irreversible reactions are occurring along the PEG chain. With PEG-X polymer, these transfer reactions are still operating but in competition with reversible chain transfer reaction now operating at the chain end of PEG-X. The competition between these degradative transfer reactions and the reversible chain transfer reaction induced by the presence of the dithiocarbonate (xanthate) end group on PEG-X takes place. Indeed, the smaller particles obtained with PEG-X show the strong implication of the xanthate during the polymerization process.

Two experiments were then performed using shorter PEG-OH and PEG-X chains.

Example 11 was carried out following the procedure described in Example 4 but using PEG-OH with $M_n$=750 g mol$^{-1}$.

Example 12 was carried out following the procedure described in Example 9 but using PEG-X with $M_n$l=1050 g mol$^{-1}$.

The operating conditions as well as the characteristics of these experiments are summarized in Table 2.

TABLE 2

Emulsion polymerization of VDF using PEG-OH[a] or PEG-X[b] using KPS as initiator at T = 80° C. and P = 30 bar

| | Polymer | Consumption (bar) | SC (%) | $D_z$ (nm) | σ | Xc (%) |
|---|---|---|---|---|---|---|
| Ex. 11[a] | PEG-OH | 14.0 | 9.9 | 215 | 0.03 | 48.1 |
| Ex. 12[b] | PEG-X | 15.0 | 10.4 | 62 | 0.06 | 48.6 |

[a]$M_{n,\ PEG\text{-}OH}$ = 750 g mol$^{-1}$.
[b]$M_{n,\ PEG\text{-}X}$ = 1050 g mo1$^{-1}$.
Reaction time: 4 h;
KPS/Polymer weight ratio = 2.5.

A stable latex with a particle size of 215 nm was obtained after 4 h of polymerization with PEG-OH for a solids content of 9.9% (Example 11). The experiment with the commercial PEG-OH gives larger particle size than PEG-X (Example 12, 62 nm). In both cases, the size is close to that obtained in the experiments carried out with PEG-OH and PEG-X having a molar mass of ca. 2000 g mol$^{-1}$ (respectively 234 nm—Example 4, and 72 nm—Example 9).

Example 13 was carried out following the procedure described in Example 11 but using 7.5 mg of PEG-X instead of 20.0 mg. The same mole number of PEG-X is thus used in Examples 9 and 13 so that the same number of xanthate chain ends are involved. However, there are less protons likely to undergo irreversible transfer reactions along the shorter PEG-X 1050 g mol$^{-1}$. This is indeed confirmed by the higher solids content obtained when using PEG-X 1050 g mol$^{-1}$.

TABLE 3

Emulsion polymerization of VDF using PEG-X of different $M_n$ using KPS as initiator at T = 80° C. and P = 30 bar

| | Polymer | Consumption (bar) | SC (%) | $D_z$ (nm) | σ | Xc (%) |
|---|---|---|---|---|---|---|
| Ex. 9 | PEG-X 2300 | 12.5 | 10.4 | 72 | 0.06 | 40.5 |
| Ex. 13 | PEG-X 1050 | 27.0 | 15.9 | 99 | 0.03 | 43.4 |

Reaction time: 4 h.
KPS and sodium acetate weight fixed—Polymer weight varied.

Kinetic studies were performed with both PEG-OH (Examples 14, 15, 16 and 4) and PEG-X (Examples 17-20).

Examples 14-16 were carried out following the procedure used in Example 4.

Examples 17-20 were carried out following the same procedure used in Example 9 however using 23.0 mg of PEG-X.

For each experiment, an inhibition period is observed for the polymerization of VDF using PEG-X macroRAFT (Examples 17-20). The polymerization is faster with the commercial PEG-OH (Examples 14, 15, 16 and 4) as illustrated by the higher VDF consumption and consequently higher SC. Moreover, for a same SC, using PEG-X leads to smaller particles, confirming the positive effect of the RAFT chain end on the stabilization compared to the commercial PEG. For instance, for a SC of 2.7%, a particle size of 143.3 nm is obtained with PEG-OH (Example 14), whereas the particle size is 49.8 nm with PEG-X for a SC of 2.4% (Example 18).

TABLE 4

Emulsion polymerization of VDF using PEG-OH[a] and PEG-X[b] using KPS as initiator at T = 80° C. and P = 30 bar—Comparison of kinetic studies

| Ex. | Polymer | Time (h) | SC (%) | $D_z$ (nm) | σ | Np (×10$^{16}$) | Xc (%) | Consumption (bar) |
|---|---|---|---|---|---|---|---|---|
| 14 | PEG-OH | 1 | 2.7 | 143 | 0.03 | 1.0 | 43.0 | 1.6 |
| 17 | PEG-X | | 1.1 | 28 | 0.43 | 52.6 | 37.2 | 0.8 |
| 15 | PEG-OH | 2 | 5.8 | 183 | 0.02 | 1.0 | 47.0 | 6.1 |
| 18 | PEG-X | | 2.4 | 50 | 0.44 | 20.6 | 35.8 | 1.5 |
| 16 | PEG-OH | 3 | 7.3 | 198 | 0.02 | 1.0 | 46.4 | 8.8 |
| 19 | PEG-X | | 4.2 | 53 | 0.20 | 30.3 | 43.4 | 4.0 |

TABLE 4-continued

Emulsion polymerization of VDF using PEG-OH[a] and PEG-X[b] using KPS as initiator at T = 80° C. and P = 30 bar—Comparison of kinetic studies

| Ex. | Polymer | Time (h) | SC (%) | $D_z$ (nm) | σ | Np ($\times10^{16}$) | Xc (%) | Consumption (bar) |
|---|---|---|---|---|---|---|---|---|
| 4 | PEG-OH | 4 | 11.2 | 234 | 0.01 | 0.9 | 41.4 | 15 |
| 20 | PEG-X | | 6.0 | 58 | 0.11 | 33.0 | 47.9 | 6.8 |

[a]$M_{n,\ PEG\text{-}OH}$ = 2000 g mol$^{-1}$.
[b]$M_{n,\ PEG\text{-}X}$ = 2300 g mol$^{-1}$.

Surface tension analyses were performed on Example 9 (PVDF latex obtained using PEG-X) and Example 4 (PVDF latex obtained using PEG-OH). In order to quantify the amount of free/unattached PEG chains in both cases (and thus not involved in particle stabilization), calibration curves were established by measuring the surface tension of PEG (—X or —OH) solutions of various concentrations. The surface tension value of Example 9 is 62.5 mN m$^{-1}$. According to the calibration curve, only 0.4 wt % of the initial amount of PEG-X is present as free polymer chains in the final latex. The same procedure was followed with latex from Example 4. The obtained surface tension value of 60.2 mN m$^{-1}$ indicates that 81.5 wt % of the initial amount of PEG-OH is present as free chains in the latex. This demonstrates that more PEG-X chains are involved in the particles stabilization than PEG-OH ones.

3.1. Examples 21-26: VDF Emulsion Polymerization in the Presence of Functional Polymers A commercial polymer HO-PEG-OH ($M_n$=2050 g mol$^{-1}$) or a di-functional X-PEG-X macroRAFT agent ($M_n$=3400 g mol$^{-1}$ and Đ=1.1) were used as stabilizers using different experimental conditions.

Example 21 using 50.0 mg of KPS, 31.0 mg of sodium acetate and 20.0 mg of HO-PEG-OH (same procedure as the one described for Example 4 in the first application)

Example 22 was carried out following the procedure described in Example 21 but replacing HO-PEG-OH by X-PEG-X Example 23 was carried out following the procedure used described in Example 22 but varying the X-PEG-X amount: 10.0 mg instead of 20 mg The operating conditions as well as the characteristics of these experiments are summarized in Table 5.

HO-PEG-OH was first used instead of PEG-OH (Examples 21 and 4, respectively). The use of either HO-PEG-OH or PEG-OH influences in the same way the particle stabilization. Indeed, for a same SC (12% for Example 21 and 11.2% Example 4), similar particle sizes are obtained (240 nm vs 234 nm for Examples 21 and 4, respectively). Whatever the type of PEG, the PVDF particle size is not affected.

Then, an experiment was performed replacing HO-PEG-OH by X-PEG-X. Different amounts of X-PEG-X were investigated. The first one (Example 22) is performed to investigate the impact of the xanthate chain end in the VDF polymerization process compared to HO-PEG-OH (Example 21). Even if the SC is lower in the case of X-PEG-X (8.5% vs 12.00%), the trend already observed for the particle size obtained when PEG-OH and PEG-X mediated emulsions were compared (respectively, Examples 4 and 9 in the first application) is also valid here: the particle size is significantly lower in the presence of the xanthate functionality (72 nm vs 240 nm), demonstrating the efficiency of the di-functional macroRAFT as macromolecular surfactant.

The second experiment (Example 23) is performed using the same number of xanthate compared to the PEG-X (Example 9) so the amount of X-PEG-X is divided by two. A higher SC is obtained (14.1% vs 10.4%), while the particle size is quite similar (124 nm versus 72 nm).

TABLE 5

Emulsion polymerization of VDF using HO-PEG-OH or X-PEG-X using KPS as initiator at T = 80° C. and P = 30 bar

| Ex. | Polymer | Time (h) | KPS/ Polymer (wt ratio) | Consumption (bar) | SC (%) | Dz (nm) | σ | Xc (%) |
|---|---|---|---|---|---|---|---|---|
| 21 | HO-PEG-OH | 4 | 2.5 | 17.5 | 12.0 | 240 | 0.04 | 43.2 |
| 22 | X-PEG-X | 4 | 2.5 | 11.3 | 8.5 | 72 | 0.06 | 44.0 |
| 23 | X-PEG-X | 4 | 5.0 | 24.4 | 14.1 | 124 | 0.06 | 42.0 |

Examples 1-7, 11, 14-16, 21, 24 and 25 are comparative examples.

Other stabilizers were then investigated for PVDF latexes: PEG-A ($M_n$=480 g mol$^{-1}$), P(PEG-A) ($M_n$=26000 g mol$^{-1}$, Đ=4.6) and P(PEG-A)-X ($M_n$=5300 g mol$^{-1}$, Đ=2.0). The first compound is a monomer, the second is the polymer synthesized with the monomer and the last one is a macroRAFT carrying a xanthate as active chain end.

Example 24 was carried out following the procedure described in Example 21 but replacing HO-PEG-OH by PEG-A Example 25 was carried out following the procedure described in Example 24 but replacing PEG-A by P(PEG-A)

Example 26 was carried out following the procedure used described in Example 25 but replacing P(PEG-A) by P(PEG-A)-X These experiments were performed step by step to investigate the xanthate involvement in the emulsion polymerization. For all experiments, a KPS/Polymer weight ratio of 2.5 and a reaction time of 4 h were chosen. A first experiment was performed with the monomer PEG-A as a reference. A latex was obtained with a SC of 4.6% and a particle size of 39 nm and a large particle size polydispersity (Example 24, Table 6). Then, a conventional radical polymerization of PEG-A was performed to obtain a P(PEG-A), which was then used in VDF emulsion polymerization (Example 25). For the same weight of P(PEG-A) compared to PEG-A, a higher consumption of VDF was observed leading to a higher SC: 13.5% for a particle size of 96 nm.

Finally, a polymer was synthesized by controlled radical polymerization of PEG-A performed in the presence of a xanthate to produce a P(PEG-A)-X macroRAFT. This macroRAFT was then used in VDF emulsion polymerization (Example 26). The reaction was slower compared to Example 25 leading to a slightly lower SC (10.7%). However, for a SC of 10.7% (Example 26), the particle size obtained was 42 nm compared to 96 nm for a SC of 13.5% (Example 25). There is only 3.5% of difference regarding the SC but the particle size obtained with the macroRAFT is twice as low as the ones for PVDF latexes stabilized with P(PEG-A). Again, the presence of X1 at the end of a macromolecular chain of a P(PEG-A) leads to better particle stabilization. P(PEG-A)-X macroRAFT has a strong impact on the VDF polymerization process. P(PEG-A)-X is a better macromolecular surfactant than PEG-A and P(PEG-A).

TABLE 6

Emulsion polymerization of VDF using PEG-A, P(PEG-A) or P(PEG-A)-X, and KPS as initiator at T = 80° C. and P = 30 bar

| Ex. | Stabi-lizer | Time (h) | KPS/ Polymer (wt ratio) | Con-sumption (bar) | SC (%) | Dz (nm) | σ | Xc (%) |
|---|---|---|---|---|---|---|---|---|
| 24 | PEG-A | 4 | 2.5 | 4.3 | 4.6 | 39 | 0.31 | 43.1 |
| 25 | P(PEG-A) | 4 | 2.5 | 21.1 | 13.5 | 96 | 0.08 | 44.5 |
| 26 | P(PEG-A)-X | 4 | 2.5 | 14.2 | 10.7 | 42 | 0.09 | 45.3 |

The invention claimed is:

1. A process for producing a stable vinylidene fluoride polymer latex by emulsion polymerization in the absence of fluorinated surfactant, said process comprising the steps of:

a) providing a PEG-based hydrophilic macroRAFT forming a first hydrophilic block, b) synthesis of a vinylidene fluoride polymer and chain extension of said hydrophilic block with vinylidene fluoride monomer, alone or in combination with at least one other ethylenically unsaturated comonomer, in the presence of initiator, and optionally of a chain transfer agent and/or a antifoulant, forming a second hydrophobic block, said hydrophilic and hydrophobic blocks composing an amphiphilic block copolymer anchored to the vinylidene fluoride polymer particles, the weight ratio initiator/macroRAFT in step b ranging from 1 to 4, and wherein said hydrophilic block comprises i) a poly(ethylene glycol) methyl ether modified with xanthate, and has the formula below:

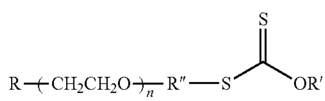

or ii) a di-hydroxy-poly(ethylene glycol) carrying a xanthate groups on each chain end, and having the formula below:

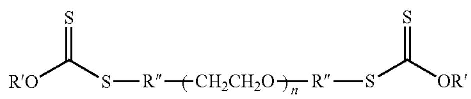

within R' is alkyl or aryl; R" is —C(═O)—C(CH$_3$)—; R is OH, O-alkyl, O-aryl or a polymer, and n is an integer of 1 or more.

2. The process of claim 1, wherein vinylidene fluoride polymer formed in step b includes both homopolymers of vinylidene fluoride and copolymers containing at least 50 mole percent of vinylidene fluoride copolymerized with at least one ethylenically unsaturated monomer selected from the group consisting of: tetrafluoroethylene, trifluoroethylene, chlorotrifluoroethylene, hexafluoropropene, vinylfluoride, pentafluoropropene, perfluoromethyl vinyl ether, perfluoropropyl vinyl ether, (meth)acrylic acid and (meth) acrylic esters such as alkyl(meth)acrylates, vinyl esters such as vinyl acetate, vinyl propionate, vinyl butyrate, vinyl benzoate, maleic esters such as dimethyl maleate, diethyl maleate, di-n-propyl maleate, diisopropyl maleate, di-2-methoxyethyl maleate, fumaric esters such as dimethyl fumarate, diethyl fumarate, di-n-propyl fumarate, diisopropyl fumarate, styrene, vinyltoluene, alpha-methylstyrene, acrylonitrile, anhydrides, vinyl esters, alpha-olefins, substituted or unsubstituted mono and dialkyl esters of unsaturated dicarboxylic acids, vinyl aromatics, and cyclic monomers.

3. The process of claim 1, wherein said initiator is a persulfate salt, selected from the group consisting of sodium persulfate, potassium persulfate, or ammonium persulfate, the amount of persulfate salt added to the reaction mixture, based upon the total weight of monomer added to the reaction mixture, being from 0.005 to 1.0 weight percent.

4. The process of claim 1, wherein said initiator is an organic peroxide selected from the group consisting of alkyl, dialkyl, or diacyl peroxide, peroxydicarbonates, and peroxy esters, said organic peroxide used in an amount from about 0.5 to about 2.5 weight percent on total weight of monomer added to the reaction mixture.

5. The process of claim 1, wherein said latex particles of vinylidene fluoride polymer have an average particle size comprised between 20 and 300 nm.

6. The process of claim 1, wherein said latex particles of vinylidene fluoride polymer have a solid content of 1 to 60 weight percent.

7. An aqueous dispersion obtained by the process of claim 1 comprising particles of vinylidene fluoride polymer, residues of initiator, and an amphiphilic block copolymer composed of a hydrophilic block containing units of PEG and of a hydrophobic block composed of vinylidene fluoride monomer, alone or in combination with at least one other ethylenically unsaturated comonomer.

8. The aqueous dispersion of claim 7, wherein said particles of vinylidene fluoride polymer have an average particle size from 20 to 300 nm, said dispersion having a solid content of 1 to 60 weight percent, and are free of fluorinated surfactant.

9. A membrane comprising the aqueous dispersion of claim 7.

10. A coating comprising the aqueous dispersion of claim 7.

11. A film comprising the aqueous dispersion of claim 7.

* * * * *